US012366681B2

(12) United States Patent
Caliaro et al.

(10) Patent No.: US 12,366,681 B2
(45) Date of Patent: Jul. 22, 2025

(54) COVER GLASS SHEET WITH DIFFERENTIAL TEXTURING

(71) Applicant: AGC GLASS EUROPE, Louvain-la-Neuve (BE)

(72) Inventors: Sebastien Caliaro, Morialme (BE); Loick Dogot, Gosselies (BE); Thomas Lambricht, Perwez (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 299 days.

(21) Appl. No.: 17/786,445

(22) PCT Filed: Dec. 18, 2020

(86) PCT No.: PCT/EP2020/087202
§ 371 (c)(1),
(2) Date: Jun. 16, 2022

(87) PCT Pub. No.: WO2021/123295
PCT Pub. Date: Jun. 24, 2021

(65) Prior Publication Data
US 2023/0358919 A1    Nov. 9, 2023

(30) Foreign Application Priority Data

Dec. 18, 2019 (EP) .................................. 19217568

(51) Int. Cl.
*G02B 1/11*    (2015.01)
*G02B 1/12*    (2006.01)
(52) U.S. Cl.
CPC . *G02B 1/11* (2013.01); *G02B 1/12* (2013.01)
(58) Field of Classification Search
CPC ..... G02B 1/11; G02B 1/12; B60R 2013/0281; B60R 2013/0287; B60R 13/02;
(Continued)

(56) References Cited

U.S. PATENT DOCUMENTS 10,787,753 B2 *   9/2020   Li ....................... B23K 26/362
2010/0066236 A1 * 3/2010   Xu ..................... H10H 20/8514
                                                      445/60
(Continued)

FOREIGN PATENT DOCUMENTS

WO   WO 2014/070869 A1   5/2014
WO   WO 2014/144322 A1   9/2014
WO   WO 2019/055581 A1   3/2019

OTHER PUBLICATIONS

International Search Report mailed on Mar. 31, 2021 in PCT/EP2020/087202 filed on Dec. 18, 2020 (4 pages).

*Primary Examiner* — Balram T Parbadia
*Assistant Examiner* — Gabriel A Sanz
(74) *Attorney, Agent, or Firm* — Oblon, McClelland, Maier & Neustadt, L.L.P.

(57) ABSTRACT

A cover glass sheet configured to cover at least a display device, having an outer sheet face and an inner sheet face where the inner sheet face faces the display device and wherein the outer sheet face includes (a) at least a display zone (1) allowing visualization of at least part of a screen of the display device, the display zone having a perimeter, $P_{display}$; and (b) at least an opaque zone (2) corresponding to a layer of opaque paint being added at the exception of the display zone, to all or part of the remaining inner sheet face and directly surrounding at least 10-100% of the display perimeter, the opaque zone has a mean surface roughness defined by an opaque arithmetic amplitude value, $Ra_{(op)}$. The outer sheet face further includes at least one textured zone covering between 0.5% to 99.5% of the opaque zone.

20 Claims, 7 Drawing Sheets (58) Field of Classification Search
CPC ......... G06F 2203/04809; G06F 1/1637; G06F 1/1643; G06F 3/0202; C03C 17/23; C03C 21/002; C03C 2204/08; C03C 2217/94; C03C 2217/944; C03C 2217/948; C03C 3/083; C03C 15/00
See application file for complete search history.

(56) References Cited

U.S. PATENT DOCUMENTS

| | | | |
|---|---|---|---|
| 2014/0098058 A1* | 4/2014 | Baharav | G06F 3/0421 345/174 |
| 2015/0299034 A1 | 10/2015 | Hou et al. | |
| 2017/0002601 A1 | 1/2017 | Bergh et al. | |
| 2018/0099904 A1 | 4/2018 | Park et al. | |
| 2018/0215657 A1 | 8/2018 | Jin | |
| 2018/0288887 A1 | 10/2018 | Okahata et al. | |
| 2018/0339937 A1 | 11/2018 | Hou et al. | |
| 2019/0219882 A1 | 7/2019 | Bergh et al. | |
| 2020/0262744 A1 | 8/2020 | Fenton et al. | |
| 2020/0299184 A1 | 9/2020 | Fenton et al. | |

* cited by examiner

COVER GLASS SHEET WITH DIFFERENTIAL TEXTURING

1. FIELD OF THE INVENTION

The present invention relates to a cover glass sheet for display applications, which demonstrates excellent optical properties, while being aesthetically pleasant.

2. BACKGROUND ART

It is well known to use cover glass sheets over displays to provide the necessary protection of the display device. In some display applications, such as displays for the car industry, it is common that the cover glass sheet is larger than the display device and is specifically designed to fit a specific location in the car such as the dashboard, the central arm rest, the door arm rest, . . . . In such applications, it could be that the cover glass sheet is even much larger than the display device. The design and aesthetics in such applications is very critical to be commercially successful.

In order to maximise the functionality of the display device, the surface of the cover glass sheet above the screen of the display device is generally textured to improve its optical properties, such as glare and sparkle reduction. A smooth, glossy and black appearance is usually expected on the remaining surface of the cover glass sheet.

Therefore, such cover glass sheets being larger than the display device to be protected and partially textured to improve the functionality of the display device, raise unacceptable difference in rendering between the zone of the cover glass sheet covering the display device and the zone not covering the display device, in particular when the display is switched off. This difference in appearance is even further increased when the zone of the cover glass sheet not covering the display device, is smooth and glossy for decorative purposes.

Therefore, the present invention addresses the technical problem of harmonising the rendering of a partially textured cover glass sheet while maintaining its superior optical properties.

3. SUMMARY OF THE INVENTION

The present invention relates to a cover glass sheet configured to cover at least one display device. The cover glass sheet has an outer sheet face and an inner sheet face wherein the inner sheet face faces the display device and comprises a layer of opaque paint. The outer sheet face comprises:
  i. at least a display zone allowing to visualize at least part of a screen of the display device, said display zone having a perimeter, $P_{display}$;
  ii. at least an opaque zone corresponding to said layer of opaque paint and directly surrounding at least 10-100% of the display perimeter. Said opaque zone has a mean surface roughness defined by an opaque arithmetic amplitude value, $Ra_{(op)}$.

The outer sheet face further comprises at least one textured zone covering between 0.5% to 99.5% of the opaque zone, said textured zone directly surrounds at least 5% of the display perimeter, and has a mean surface roughness defined by a textured arithmetic amplitude value, $Ra_{(tex)}$. The absolute difference between $Ra_{(op)}$ and $Ra_{(tex)}$ is at least 25 nm ($|Ra_{(op)} - Ra_{(tex)}| \geq 25$ nm).

Other aspects and advantages of the embodiments will become apparent from the following detailed description taken in conjunction with the accompanying drawings which illustrate, by way of example, the principles of the described embodiments.

4. BRIEF DESCRIPTION OF THE DRAWINGS

FIG. 1b shows a cross section along the line AA', of a display unit comprising the cover glass sheet of FIG. 1a.

5. DETAILED DESCRIPTION OF THE INVENTION

It is an object of the present invention to provide a cover glass sheet to be used in display applications, providing superior optical performance while maintaining superior aesthetics properties.

The present invention addresses the technical problem of difference in rendering between the display zone—being textured to obtain superior optical properties and the opaque zone—being preferably black and shiny. This is especially apparent when the display device is switched off. The present invention is therefore based on the definition of at least a third zone, herein after referred to as "textured zone", on the outer face of the cover glass sheet, covering partially the opaque zone and positioned around the display zone. Such third zone is textured so that its mean surface roughness is different than the mean surface roughness of the opaque zone. The addition of such textured zone over the opaque zone around the display perimeter, reduces greatly the rendering difference and therefore improves substantially the aesthetics of the cover glass sheet while maintaining the superior optical performance.

The display zone on the outer surface of the cover glass sheet, allows to visualize the display device. Hence, the surface of the display zone is typically textured to provide superior optical performance such anti-glare and/or anti-sparkle properties. There is also an increasing demand of the display market to combine the anti-glare/anti-sparkle solution for cover glass sheets with a pleasant smooth touch sensation (often called a satin, silk or soft touch). At the exception of the display zone, the inner sheet face of the cover glass sheet is generally covered—completely or partially, by an opaque layer to provide a dark color appearance. Such defines on the outer face of the cover glass sheet, a corresponding opaque zone. The opaque zone has usually a smooth and glossy surface, especially when used for car applications. When the display device is turned OFF, both the display zone and the opaque zone are dark colored and therefore absorb the light radiation. However, the rendering between these 2 zones is very different. Indeed the opaque zone absorbs greatly the light radiation whereas the display zone absorbs but also reflects and diffuses the light radiation. Such difference in reflection gives a difference in rendering. This rendering differential becomes even more acute depending on the relative position of the user to the display unit. Indeed, the more grazing is the view of the user, the more problematic becomes the difference in rendering. It has been surprisingly found such difference of rendering can be substantially mitigated by a careful and specifically positioned texturing of the opaque zone. The present invention is based on the surprising technical finding that this difference in reflection between the opaque zone and the display zone can be greatly reduced by texturing part of the opaque zone around the display perimeter. The specific texture of such texture zone increases greatly the diffusion of the reflection on the outer face of the cover glass sheet. The difference in light interaction at the inner face is concealed and therefore it alleviates significantly the difference in rendering while allowing to maintain the optical performance of the display zone, especially when viewed at a grazing angle. Furthermore, it is an object of the present invention to texture differently part of the opaque zone depending on the relative position of the user versus the display unit.

The present invention relates to a cover glass sheet configured to cover one or more display device(s). The cover glass sheet has an outer sheet face and an inner sheet face wherein the inner sheet face faces the display device(s).

Figure 1A:
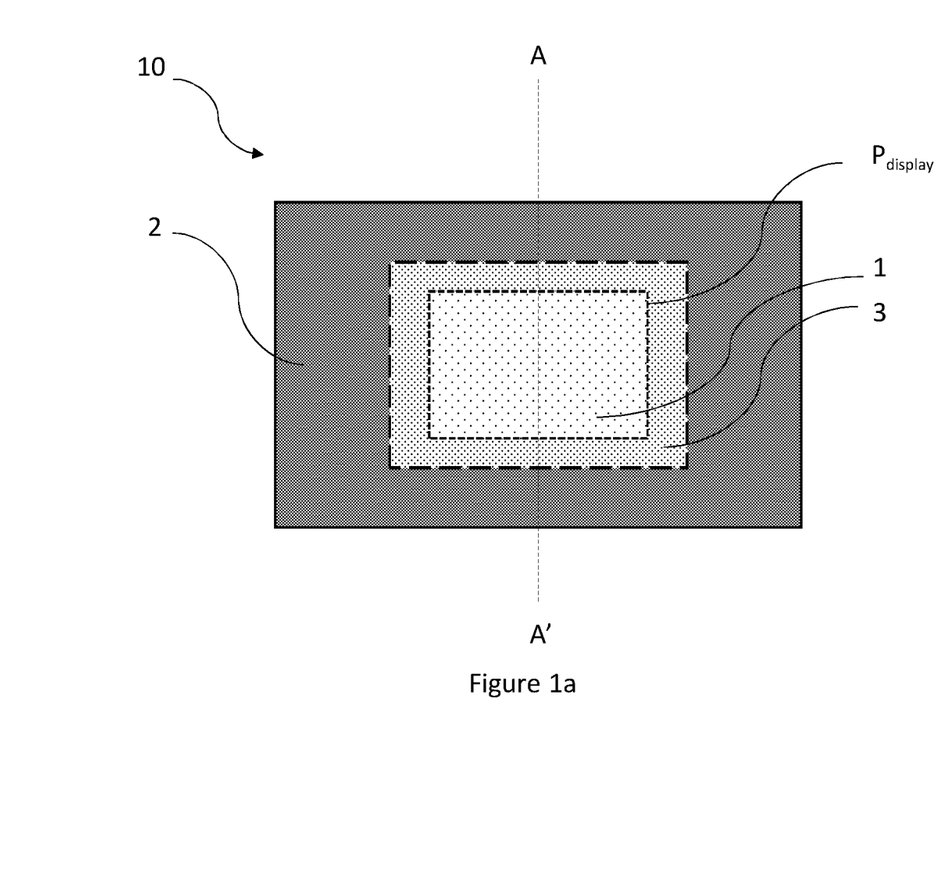
FIG. 1a shows a top view of a cover glass sheet according to one embodiment of the present invention wherein the opaque zone surrounds entirely the display zone and wherein the textured zone located in the opaque zone, surrounds completely the display zone.
Figure 2:
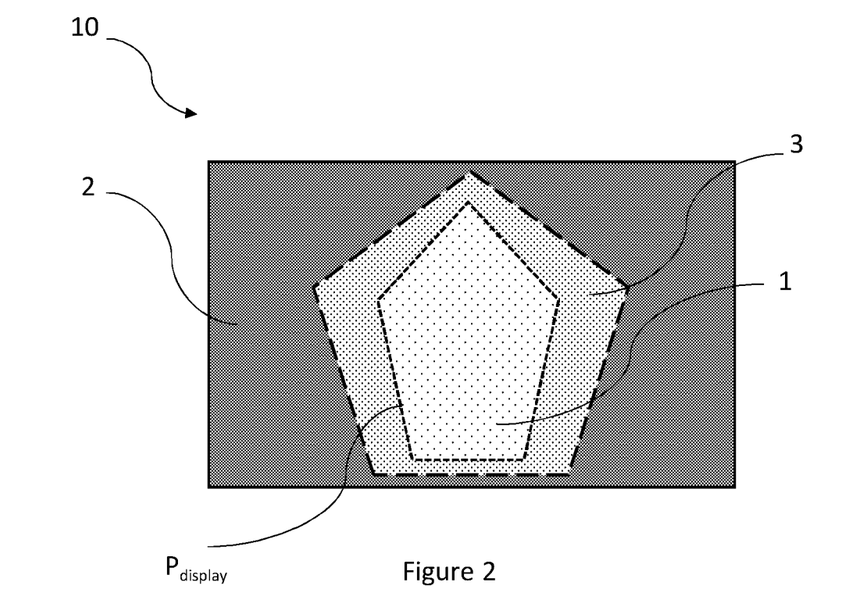
FIG. 2 shows a top view of a cover glass sheet according to one embodiment of the present invention wherein the display device has a polyhedral shape and wherein the opaque zone and corresponding textured zones differ in shape from the display zone.
Figure 3:
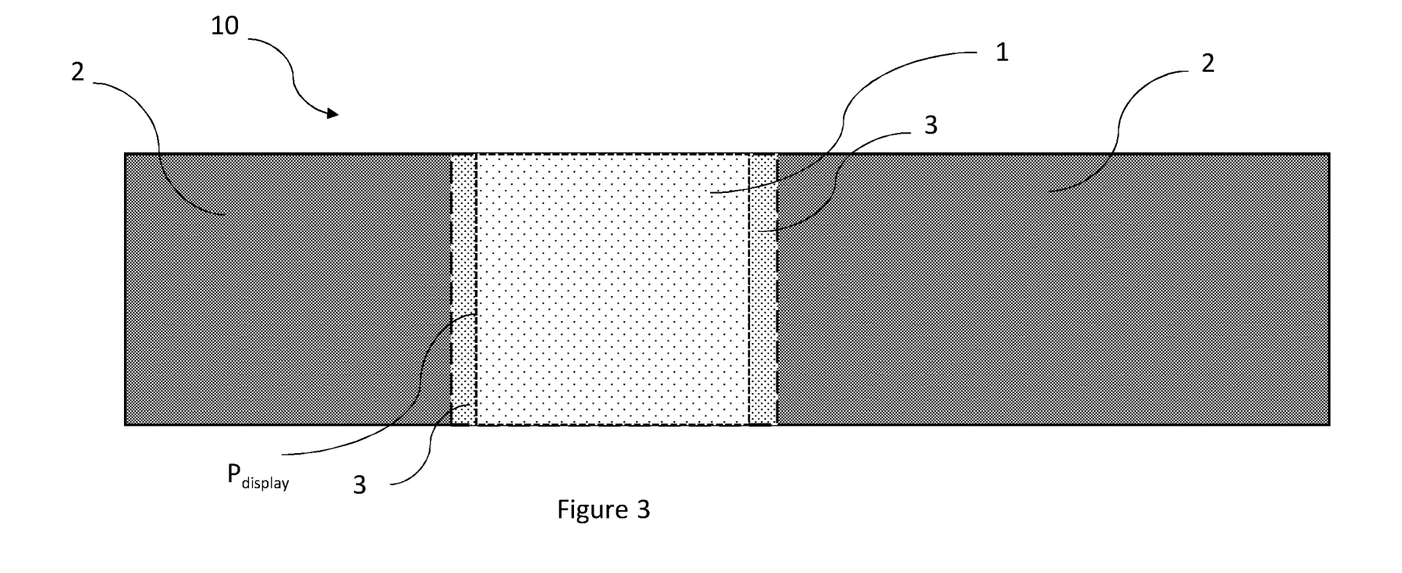
FIG. 3 shows a top view of a rectangular cover glass sheet according to one embodiment of the present invention comprising 2 opaque zones located on both lateral sides of the rectangular display zone. Each opaque zone comprises a thin textured zone adjacent to the lateral side of the display zone.

For the avoidance of doubt, the term "surround" used herein means "outwardly surround". As illustrated in FIG. 1a, the cover glass sheet (10) comprises on its outer sheet face:
- (a) at least a display zone (1) allowing to visualize the screen of a corresponding display device. Each display zone has a perimeter, $P_{display}$. The size and shape of the display zone can correspond to the size and shape of the screen of the display device or can differ e.g. its size can be smaller and/or its shape can be of any shape while the display can remain of the classical form; as long as it allows to visualise part or all of the screen of the display device. In some instances, it might be more convenient and cost effective to create circular or any other shape display views by designing circular or any other shape display zone(s) over classical rectangular display device.
- (b) at least an opaque zone (2) corresponding to a layer of opaque paint being added at to the inner sheet face. By definition, such layer of opaque paint is added to the inner sheet face at the exception of the display zone. I can be added to all or part of the remaining inner sheet face. It directly surrounds from 10-100% of the display perimeter. If several opaque zones, all opaque zone(s) have preferably a mean surface roughness defined by the same opaque arithmetic amplitude value, $Ra_{(op)}$. In a preferred embodiment, the layer of opaque paint directly surrounds at least 25%, at least 50%, preferably 75%, more preferably 90% and even more preferably 100% of the display perimeter. To each display zone, will correspond at least one opaque zone. The opaque zone is the zone on the outer sheet face of the cover glass sheet that is defined by the corresponding zone of the inner sheet face wherein a layer of opaque paint is added. Such will not cover the display zone. It can further be covering all or part only of the remaining surface of the inner sheet face. The outer sheet face of the cover glass sheet may have more than one opaque zone, for example on opaque zone on each lateral side of a rectangular display zone as depicted in FIG. 3.
- (c) at least a textured zone (3) covering between 0.5% to 99.5% of the opaque zone. In one embodiment, the textured zone covers preferably 1% to 75% of the opaque zone, more preferably 2% to 60%, more preferably between 5% to 50% of the opaque zone. In another embodiment, the textured zone covers preferably between 80% to 99.5% of the opaque zone, preferably between 90% to 98% of the opaque zone, more preferably between 92% to 95% of the opaque zone. The textured zone is positioned around and is in direct contact with the display perimeter and so directly surrounds at least 5%, better 10% of the display perimeter, preferably 25%, more preferably 50%, even more preferably 75%, even more preferably 90%, and ideally 100% of the display perimeter. The mean surface roughness of the textured zone is defined by a textured arithmetic amplitude value, $Ra_{(tex)}$. The outer sheet face of the cover glass sheet may have more than one textured zone(s), such as depicted in FIG. 3 wherein the opaque zone encompasses a textured zone on each lateral side of a rectangular display zone. The textured zone can have any shape and does not necessarily match the shape of the display zone nor of the opaque zone as illustrated in FIG. 2. In some embodiment, it can happen that the textured zone extends outside of the opaque zone.

The cover glass sheet of the present invention is characterised in that the opaque zone has a mean surface roughness defined by an opaque arithmetic amplitude value, $Ra_{(op)}$ and that the textured zone has a mean surface roughness defined by a textured arithmetic amplitude value, $Ra_{(tex)}$ so that the absolute difference between $Ra_{(op)}$ and $Ra_{(tex)}$ is at least 25 nm ($|Ra_{(op)}-Ra_{(tex)}| \geq 25$ nm), preferably at least 50 nm ($|Ra_{(op)}-Ra_{(tex)}| \geq 50$ nm), more preferably at least 100 nm ($|Ra_{(op)}-Ra_{(tex)}| \geq 100$ nm), even more preferably at least 200 nm ($|Ra_{(op)}-Ra_{(tex)}| \geq 200$ nm). For the avoidance of doubt, the $Ra_{(op)}$ is not measured in the opaque zone that has been further textured to become the textured zone. Typically, the absolute difference between $Ra_{(op)}$ and $Ra_{(tex)}$ is no more than 2 microns, preferably no more than 1 micron.

In a preferred embodiment for aesthetics reasons and/or ease of processing, the display zone has a mean surface roughness defined by a display arithmetic amplitude value, Rad, being equal to the mean surface roughness of the textured zone, $Ra_{(tex)}$ (Rad=$Ra_{(tex)}$). Typical mean surface roughness for the opaque zone, Ra(op) are from 0.1 nm to 5 nm, preferably from 0.1 nm to 3 nm. Typical mean surface roughness for the textured zone, Ra(tex) are from 0.025 microns to 2 microns, preferably from 0.05 microns to 1 microns more preferably from 0.1 microns to 1 microns. Typical mean surface roughness for the display zone zone, Rad are from 0.05 microns to 2 microns, preferably from 0.1 microns to 1 microns.

In a preferred embodiment of the present invention, the cover glass sheet can comprise at least a secondary textured zone (4) indirectly surrounding the display perimeter. The secondary textured zone is encompassed within the opaque zone but is not in direct contact with the display perimeter. The secondary textured zone has a mean surface roughness defined by a second textured arithmetic amplitude value, $Ra2_{(tex)}$. Preferably, the absolute difference between $Ra_{(op)}$ and $Ra2_{(tex)}$ is at least 25 nm ($|Ra_{(op)}-Ra2_{(tex)}|\geq 25$ nm), more preferably at least 50 nm ($|Ra_{(op)}-Ra2_{(tex)}|\geq 50$ nm), even more preferably at least 100 nm ($|Ra_{(op)}-Ra2_{(tex)}|\geq 100$ nm), even better at least 200 nm ($|Ra_{(op)}-Ra2_{(tex)}|\geq 200$ nm). It has been found that such secondary textured surfaces positively participate to the overall aesthetics performance of the cover glass sheet and mitigate even further the rendering differential. Furthermore, it has been found that the addition of one or more such secondary textured zone(s) can be used to provide guidance to the user's finger to reach and activate a function on the display. In a preferred embodiment, the at least secondary textured zone covers between 5% to 90% of the opaque zone, preferably 5% to 75% of the opaque zone, preferably between 5% to 60% of the opaque zone, more preferably between 5% to 50% of the opaque zone. In a preferred embodiment for aesthetics reasons and/or ease of processing, the mean surface roughness of the second textured zone, $Ra2_{(tex)}$, is equal to the mean surface roughness of the textured zone, $Ra1_{(tex)}$. In another preferred embodiment, the second textured arithmetic amplitude value, $Ra2_{(tex)}$ is equal to the display mean surface roughness, Rad ($Ra2_{(tex)}$=Rad).

The cover glass sheet of the present invention is configured to cover one or more display device(s), each defining a respective display zone, having each respectively a display perimeter. To each display zone of the outer sheet face of the cover glass sheet, can correspond one or more opaque zone(s). To each opaque zone of the outer sheet face of the cover glass sheet, can correspond one or more textured zone(s). The opaque zone can further comprise one or more secondary textured zone(s). Therefore, it is to be understood that when referred to a technical feature characterising of a display zone, an opaque zone, a textured zone and/or a secondary textured zone, it does apply to all display zones, opaque zones, textured zones and/or secondary textured zones of the cover glass sheet of the present invention.

Detailed Description of the Figures

Figure 1B:
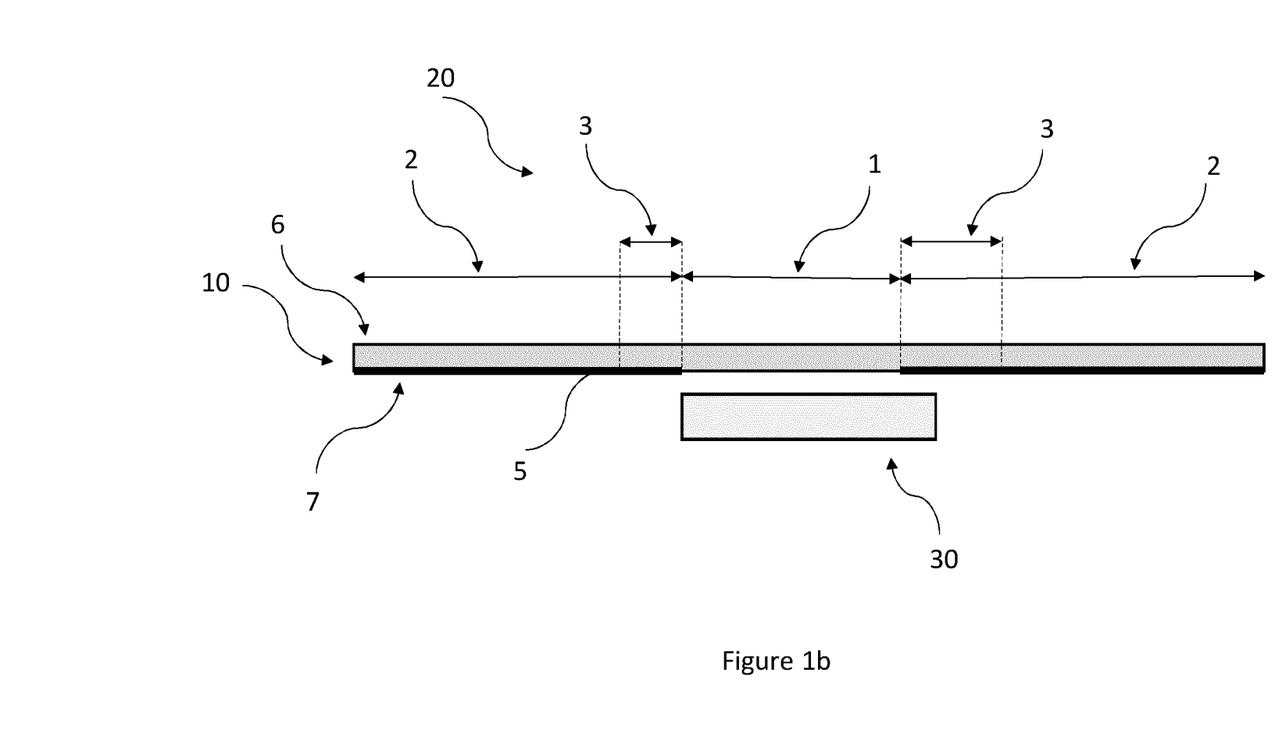

FIG. 1a illustrates one embodiment of the present invention wherein the cover glass sheet (10) is configured to cover one rectangular display device and has one display zone (1). The opaque zone (2) is defined by the opaque painted added to all inner sheet face of the cover glass sheet but the display zone. The display zone (1) is slightly smaller than the surface of the display screen. The opaque zone (2) directly surrounds 100% of the display perimeter. The textured zone (3) also directly surrounds 100% of the display perimeter and is totally encompassed within the opaque zone. FIG. 1b illustrates a cross sectional view of a display unit (20) comprising the cover glass sheet of FIG. 1a (10) along the line A-A' and a display device (30). As depicted in FIG. 1b, the inner face of the cover glass sheet (7) is covered by a layer of opaque paint (5), defining the opaque zone (2) on the corresponding surface on the outer face of the cover glass sheet (6). It can be seen that the opaque paint covers a small part of the inner sheet face over the display screen and therefore the display zone is slightly smaller than the surface of the display screen. The textured zone (3) directly surrounds the display perimeter and is totally encompassed within the opaque zone.

FIG. 2 illustrates a variant of the embodiment of FIG. 1a wherein the textured zone (3) has a different shape than the display zone (1).

FIG. 3 illustrates one embodiment of the present invention wherein the cover glass sheet (10) is configured to cover one rectangular display device and has one display zone (1). Opaque painted is added to all inner sheet face of the cover glass sheet but the display zone and defines two opaque zones (2) directly surrounding the lateral sides of the display perimeter. Two textured zones (3) also directly surround the lateral sides of the display perimeter, each being totally encompassed within the corresponding opaque zone.

Figure 4:
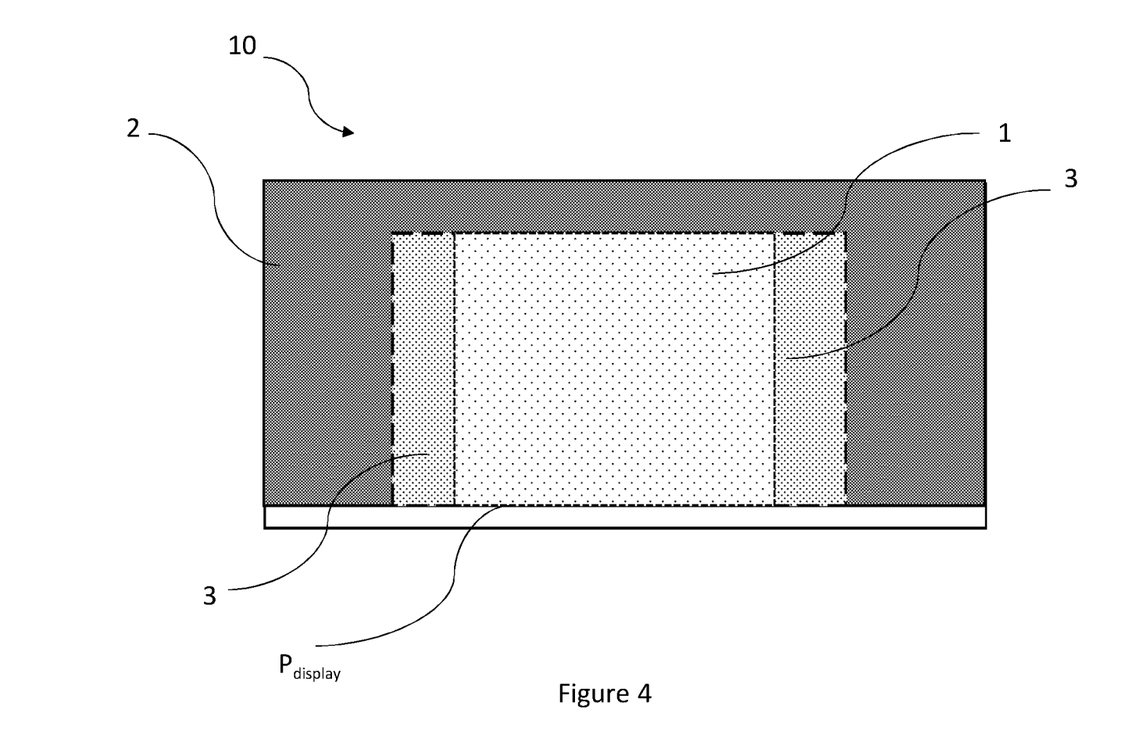
FIG. 4 shows a top view of a cover glass sheet according to one embodiment of the present invention wherein the layer of opaque paint defining the corresponding opaque zone on the outer sheet face of the cover glass sheet, is added only to a part of the inner sheet face of the cover glass sheet.

FIG. 4 illustrates one embodiment of the present invention wherein the cover glass sheet (10) is configured to cover one rectangular display device and has one display zone (1). The opaque zone (2) is defined by the opaque painted added at the exception of the display zone, to part only of the remaining inner sheet face. The opaque zone directly surrounds 3 sides of the rectangular display perimeter. Two textured zones (3) directly surrounds the lateral sides of the display perimeter.

Figure 5:
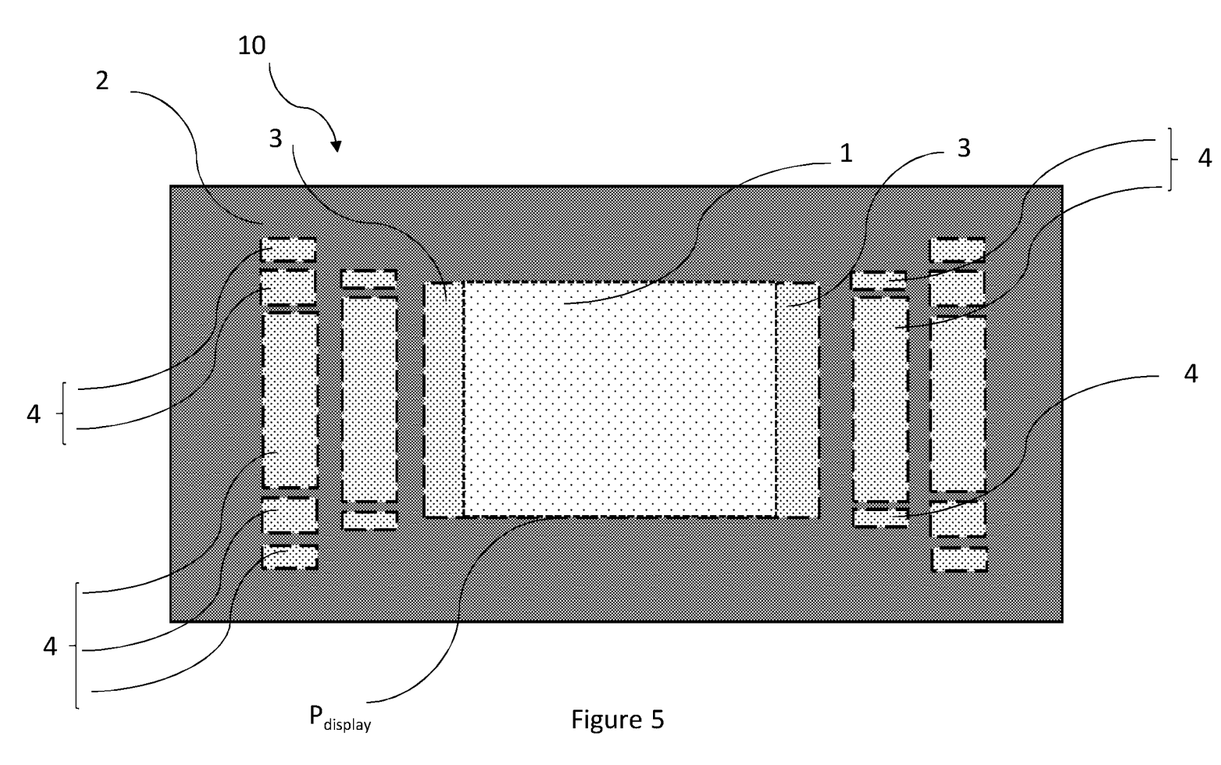
FIG. 5 shows a top view of a cover glass sheet according to one embodiment of the present invention comprising a display zone, an opaque zone and a textured zone, as well as secondary textured zones.

FIG. 5 illustrates a embodiment of the present invention wherein the cover glass sheet (10) is configured to cover one rectangular display device and has one display zone (1). The opaque zone (2) is defined by the opaque painted added to all inner sheet face of the cover glass sheet but the display zone and directly surrounds 100% of the display perimeter. Two textured zones (3) directly surrounds the lateral sides the display perimeter and are totally encompassed within the opaque zone. The outer sheet face of the cover glass sheet further comprises several secondary textured zones (4) encompassed within the opaque zone.

Figure 6:
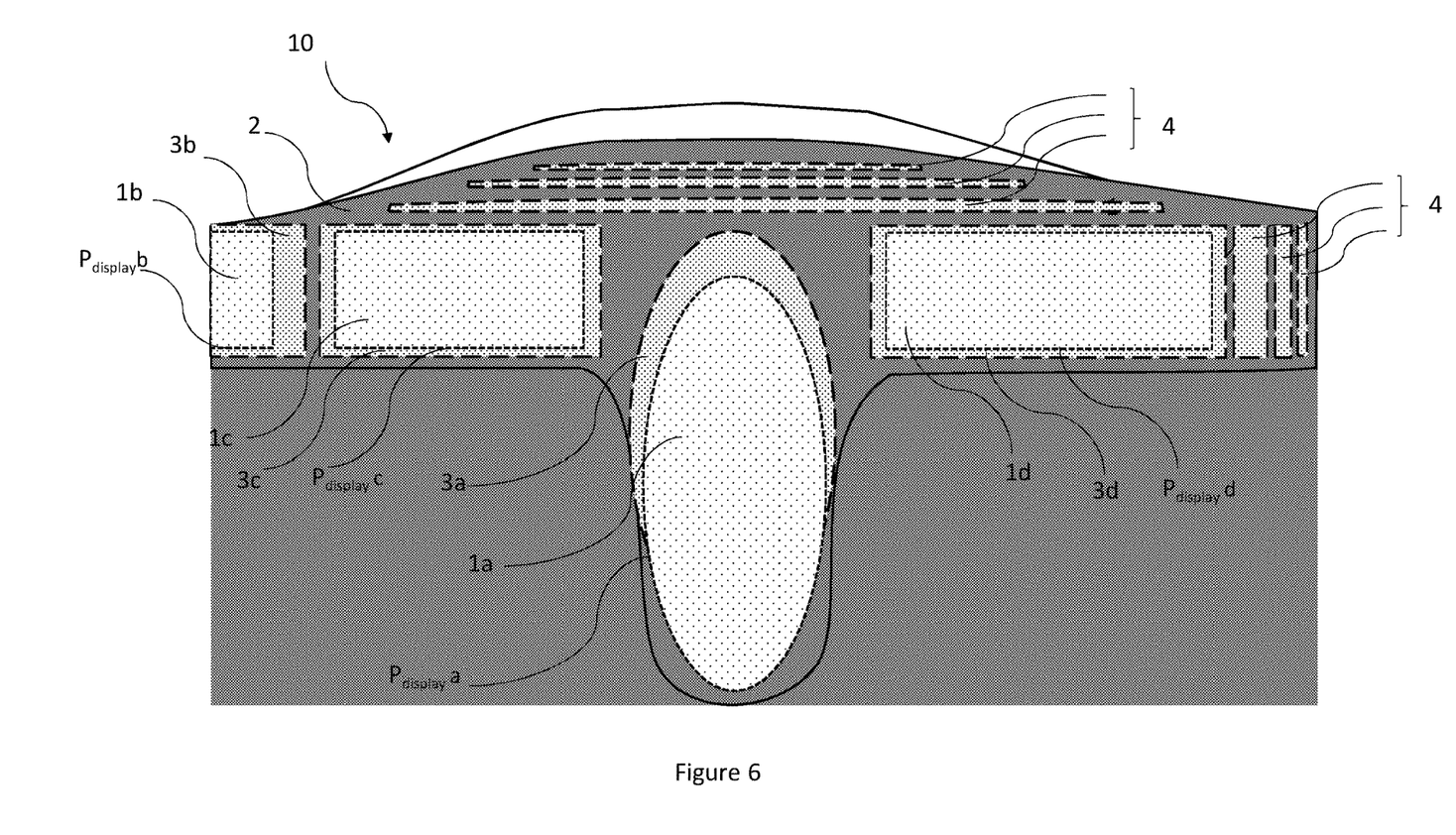
FIG. 6 shows a top view of a cover glass sheet according to one embodiment of the present invention wherein the cover glass sheet comprises several display zones and their corresponding textured zone(s) as well as several secondary textured zones.

FIG. 6 illustrates an embodiment of the present invention wherein the cover glass sheet (10) is configured to cover several display devices with their respective display zone (1a), (1b), (1c) and (1d). The opaque zone (2) is defined by the opaque paint is added at the exception of the display zone, to part only of the remaining inner sheet face. Indeed, a small portion of the inner sheet face at the top of the cover glass sheet has not been covered by opaque paint. The opaque zone directly surrounds about 65% the display perimeter of the display zone (1b) and totally the display perimeters of the display zones (1a), (1c) and (1d). The textured zone (3a) directly surrounds about 50% of its respective display perimeter and is totally encompassed within the opaque zone. The textured zone (3b) directly surrounds about 65% of its respective display perimeter and is totally encompassed within the opaque zone. The textured zones (3c) and (3d) directly surround 100% of their respective display perimeter, and are totally encompassed within the opaque zone. The cover glass sheet further comprises several secondary textured zones (4) indirectly surrounding the display perimeters.

The present invention also relates to a display unit comprising a cover glass sheet as described above and a display device positioned under the display zone. Preferably, the display unit further comprises an optical bonding located between the display device and the inner sheet face of the cover glass sheet.

The present invention relates to the use of a cover glass sheet or a display unit for car interior application, home appliances and/or integrated interactive display. The cover glass sheet and the display unit according to the present invention are particularly suitable for vehicle's interior glazing such as a console, a dashboard, car external windows, a glass trim element for which more and more complexed shaped are requested by car's manufacturers.

General Description

For display applications, it is known to texture the outer surfaces of the cover glass sheet to provide anti-glare and/or anti-sparkle performance and a specific gentle touch feeling. According to the invention, the outer sheet face of the cover glass sheet is textured. By "textured surface", it is meant a surface which has been attacked by a mechanical or chemical way, removing a certain amount of glass material and giving a specific surface texture/roughness. We talk about chemically-etched glass when material removal occurs by chemical reactions/attack (i.e. acid etching). We talk about mechanically-etched glass when material removal occurs by mechanical reactions/attack (i.e. sandblasting). Chemical etching (i.e., using HF and/o fluoride compounds) is preferred as it allows reaching roughness and in consequence, optical properties and aesthetic appropriate for the targeted applications.

The textured surface of a glass sheet is usually characterized by its surface texture or roughness, and in particular, by the Ra values (expressed as microns or nm) defined in the standard ISO 4287-1997. The texture/roughness is a consequence of the existence of surface irregularities/patterns. These irregularities consist of bumps called "peaks" and cavities called "valleys". On a section perpendicular to the textured surface, the peaks and valleys are distributed on either side of a "center line" (algebraic average) also called "mean line". In a profile and for a measurement along a fixed length (called "evaluation length"): Ra (amplitude value) corresponds to the average difference of texture, meaning the arithmetic average of absolute values of differences between the peaks and valleys. Ra measure the distance between this average and the "line" and gives an indication of the height of the patterns on the textured surface;

The roughness values according to the invention may be measured with a profilometer using 2D profiles (according to ISO4287 standard). Alternatively, one can use the technique of 3D profilometry (according to ISO 25178 standard) but isolating a 2D profile which then gives access to the parameters defined in the ISO4287 standard. According to the invention, the roughness values are measured with a Gaussian filter, which is a filter of long wavelengths, also called profile filter Inc. It is used for separating the components of roughness/texture from components of undulation of the profile. The evaluation length, L, according to the invention is the length of the profile used to evaluate the roughness. Base length, I, is the part of the evaluation length used to identify irregularities characterizing the profile to assess. The evaluation length, L, is divided/cut into n base lengths, I, which depend on the profile irregularities. The base length, I, corresponds to the "cut-off" wavelength (or limit wavelength) of the Gaussian filter (I=λc). Typically, the evaluation length is of at least five times the base length. In roughness measurements, a short wavelength filter (profile filter λs) is also commonly used to eliminate the effects of very short wavelengths which are background noise.

In order to create the differential mean surface roughness between the display zone, opaque zone, the textured zone and/or the secondary textured zone, the partial texture can be created by any known methods that allows to selectively texture a glass surface and thereby creating textured zone(s). For example, if one considers creating the texture according to the invention by chemical etching, one may use a known method using a protective mask, which is resistant to the chemical etching treatment, making it possible to expose, to the etching treatment, only certain parts/zones of the surface of the glass, and which is then subsequently removed. The etched texture zones consequently obtained on the glass surface corresponds to the negative of the mask applied beforehand.

The cover glass sheet of the present invention can be manufactured from a larger mother glass substrate by the following method comprising the steps of, in order:
a) providing a partially textured mother glass substrate having a first main surface and a second main surface which are opposed to each other. The partial texture is typically present on the first main surface (and may be also present on the second main surface or on both surfaces),
b) irradiating at least the first main surface of the glass substrate with a laser to form, on the first main surface, at least one separating line defining contour lines and extending in a depth direction from the first main surface to the second main surface, for dividing at least one cover glass sheet from the glass substrate, the cover glass sheet having a size smaller than the size of the mother glass substrate, and
c) separating the at least one partially textured cover glass sheet from the mother glass substrate according to the at least one separating line.

The above method can comprise a further step: after step b) of irradiating and before step c) of separating, the mother glass substrate is chemically strengthened. This embodiment is advantageous as it allows reinforcing the cover glass sheet(s) at their main surfaces but also at their edges. The cover glass sheet is therefore more resistant to scratches and mechanical stress/load. According to this embodiment, after the mother glass substrate is chemically strengthened: (i) the level of potassium (or the largest invading ion) at the first and second main surfaces of the cover glass sheet(s) is higher than the level of potassium (or the largest invading ion) at the edges of the cover glass sheet(s), and (ii) the level of potassium at the edges of the cover glass sheet(s) is higher than the level of potassium in the bulk of the cover glass sheet. As the level of potassium at the end faces of the cover glass sheet(s) is increased during the chemical strengthening, they are more resistant to external load stress.

The conditions of the chemical strengthening are not particularly limited. Chemical strengthening may be carried out, for example, by dipping the mother glass substrate in molten salt at 380° C. to 500° C. for 1 minute to 72 hours. As the molten salt, nitrate may be used. For example, when replacing the lithium ions contained in the glass substrate with a larger alkali metal ion, a molten salt containing at least one of sodium nitrate, potassium nitrate, rubidium nitrate, and cesium nitrate may be used. Further, in the case of replacing the sodium ions contained in the glass substrate with a larger alkali metal ion, a molten salt containing at least one of potassium nitrate, rubidium nitrate, and cesium nitrate may be used. Furthermore, when replacing the potassium ion contained in the glass substrate with a larger alkali metal ion, a molten salt containing at least one of rubidium nitrate and cesium nitrate may be used. In addition, one or more kinds of salts such as potassium carbonate may be further added to the molten salt. In this case, a low density layer having a thickness of 10 nm to 1 μm can be formed on the surface of the mother glass substrate.

By subjecting the mother glass substrate on which the at least one separating line defining contour lines of the at least one cover glass sheet to a chemical strengthening treatment, a compression stress layer can be formed at the first main surface and the second main surface of the glass substrate and at edges of the glass article(s). The thickness of the compressive stress layer corresponds to the penetration depth of alkali metal ions for substitution. For example, in the case of replacing sodium ions with potassium ions using potassium nitrate, the thickness of the compressive stress layer can be 5 μm to 50 μm for soda-lime glass, and the thickness of the compression stress layer for aluminosilicate glass is 10 μm to 100 μm. In the case of aluminosilicate glass, the penetration depth of alkali metal ions is preferably 10 μm or more, more preferably 20 μm or more.

The method may further comprise a step of cold bending after step c) of separating. The cold bending is particularly appreciated for bending glass articles for interior and exterior glazing part for automotive such as glass console, dashboard, trim element for door, pillars, windshields, side windows, back windows, sun roofs, separation walls, . . . . Cold bending is any assembling operation in which an initially flat thin glass element is deformed into a final non-flat configuration in the assembly. The thin glass in the final assembly present a permanent unbalance of surface stresses between its two main surfaces. The assembling operation can be any kind of technology allowing to keep the thin glass in a non-flat configuration: gluing, laminating, mechanical retainers (screws, rivet, casing, . . . ), . . . , applied either at punctual places or on the full surface.

The cover glass sheet obtained by the method described above, is characterized in that it has at least one edge showing angles formed with first and second main surfaces each equal to 90°+/−7°. Furthermore, cover glass sheet obtained by the method described above, shows a level of potassium at the first and second main surfaces of the glass article higher than the level of potassium at the edges of said glass article, and a level of potassium at the edges of the glass article higher than the level of potassium in the bulk of the cover glass sheet. As the level of potassium at the edges of the article is increased, said edges are more mechanically resistant.

The cover glass sheet according to the invention can have a thickness between 0.03 and 19 mm, preferably between 0.03 mm to 6 mm. Preferably, for reasons of weight and to be able to cold bend easily the thickness of the cover glass sheet may be from 0.1 to 2.2 mm, 0.5 to 2.1 mm. The cover glass sheet typically covers display devices having a display diagonal of from 8 cm to 25 cm, preferably from 8 cm to 40 cm.

The opaque paint added on the inner sheet face of the cover glass sheet can be an enamel compound, an epoxy-based compound or polyurethane-based compound.

The cover glass sheet according to the invention is made of glass whose matrix composition is not particularly limited and may thus belongs to different categories. The glass may be a soda-lime-silicate glass, an alumino-silicate glass, an alkali-free glass, a boro-silicate glass, etc. Preferably, the glass sheet of the invention is made of a soda-lime glass or an alumino-silicate glass.

According to an embodiment of the invention, the glass sheet has a composition comprising, in a content expressed in percentages of the total weight of the glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

In a preferred embodiment, the glass sheet has a composition comprising, in a content expressed in percentages of the total weight of the glass:

| | |
|---|---|
| $SiO_2$ | 55-78% |
| $Al_2O_3$ | 0-18% |
| $B_2O_3$ | 0-18% |
| $Na_2O$ | 5-20% |
| CaO | 0-10% |
| MgO | 0-10% |
| $K_2O$ | 0-10% |
| BaO | 0-5%. |

In a more preferred embodiment, the glass sheet has a composition comprising, in a content expressed in percentages of the total weight of the glass.

| | |
|---|---|
| $SiO_2$ | 65-78% |
| $Al_2O_3$ | 0-6% |
| $B_2O_3$ | 0-4% |
| CaO | 0-10% |
| MgO | 0-10% |
| $Na_2O$ | 5-20% |
| $K_2O$ | 0-10% |
| BaO | 0-5%. |

In an alternative more preferred embodiment, the glass sheet has a composition comprising, in a content expressed in percentages of the total weight of the glass.

| | |
|---|---|
| $SiO_2$ | 55-70% |
| $Al_2O_3$ | 6-18% |
| $B_2O_3$ | 0-4% |
| CaO | 0-10% |
| MgO | 0-10% |
| $Na_2O$ | 5-20% |
| $K_2O$ | 0-10% |
| BaO | 0-5%. |

Ideally, according to these last two embodiments, the glass compositions do not comprise $B_2O_3$ (meaning that it is not intentionally added, but could be present as undesired impurities in very low amounts). Such two soda-lime-type base glass composition embodiments have the advantages to be inexpensive even if it is less mechanically resistant as such.

According to an advantageous embodiment of the invention, combinable with previous embodiments on base glass composition, the glass sheet has a composition comprising a total iron (expressed in terms of $Fe_2O_3$) content ranging from 0.002 to 0.06 wt %. A total iron (expressed in the form of $Fe_2O_3$) content of less than or equal to 0.06 wt % makes it possible to obtain a glass sheet with almost no visible coloration and allowing a high degree of flexibility in aesthetic designs (for example, getting no distortion when white silk printing of some glass elements of smartphones). The minimum value makes it possible not to be excessively damaging to the cost of the glass as such, low iron values often require expensive, very pure, starting materials and also purification of these. Preferably, the composition comprises a total iron (expressed in the form of $Fe_2O_3$) content ranging from 0.002 to 0.04 wt %. More preferably, the composition comprises a total iron (expressed in the form of $Fe_2O_3$) content ranging from 0.002 to 0.02 wt %. In the most preferred embodiment, the composition comprises a total iron (expressed in the form of $Fe_2O_3$) content ranging from 0.002 to 0.015 wt %.

According to another embodiment of the invention, in combination with previous embodiments on $Fe_2O_3$ content, the glass has a composition comprising chromium in a content such as: $0.0001\% \leq Cr_2O_3 \leq 0.06\%$, expressed in percentages of the total weight of glass. Preferably, the glass has a composition comprising chromium in a content such as: $0.002\% \leq Cr_2O_3 \leq 0.06\%$. This chromium content allows getting a glass with a higher IR transmission and it is thus advantageous when using the glass sheet in a touch panel using optical IR touch technologies like, for example, the Planar Scatter Detection (PSD) or Frustrated Total Inner Reflection (FTIR) (or any other technology requiring high transmission of IR radiation) in order to detect the position of one or more objects (for example, a finger or a stylus) on a surface of the glass sheet.

The cover glass sheet according to the invention can advantageously be prestressed glass. By prestressed glass, it means a heat strengthened glass, a thermally toughened glass, or a chemically strengthened glass. Heat strengthened glass is heat treated using a method of controlled heating and cooling which places the glass surfaces under compression and the glass core under tension. This heat treatment method delivers a glass with a bending strength greater than annealed glass but less than thermally toughened safety glass.

Thermally toughened safety glass is heat treated using a method of controlled heating and cooling which puts the glass surface under compression and the glass core under tension. Such stresses cause the glass, when impacted, to break into small granular particles instead of splintering into jagged shards.

The chemical strengthening of a glass article is a heat induced ion-exchange, involving replacement of smaller alkali sodium ions in the surface layer of glass by larger ions, for example alkali potassium ions. Increased surface compression stress occurs in the glass as the larger ions "wedge" into the small sites formerly occupied by the sodium ions. Such a chemical treatment is generally carried out by immerging the glass in an ion-exchange molten bath containing one or more molten salt(s) of the larger ions, with a precise control of temperature and time. Aluminosilicate-type glass compositions, such as for example those from the products range DragonTrail® from Asahi Glass Co. or those from the products range Gorilla® from Corning Inc., are also known to be very efficient for chemical tempering.

The chemical strengthening and its resulting properties described above in the context of the preferred method to manufacture the cover glass sheet of the present invention, from a larger mother glass substrate is not intended to be limited to said manufacturing method but can be applied to the cover glass sheet independently of the manufacturing method used.

According to the applications, intended use and/or properties desired, various layer(s)/treatment(s) can be deposited/done on the cover glass sheet of the invention, on one or both faces of the cover glass sheet.

According to one embodiment of the invention, the cover glass sheet can be coated with at least one transparent and electrically conducting thin layer. A transparent and conducting thin layer according to the invention can, for example, be a layer based on $SnO_2{:}F$, $SnO_2{:}Sb$ or ITO (indium tin oxide), ZnO:Al or also ZnO:Ga. According to another embodiment of the invention, the cover glass sheet can be coated with at least one antireflection layer. This embodiment is advantageous in the case of use of the cover glass sheet of the invention as front cover of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index. According to still another embodiment, the glass sheet has at least one anti-fingerprint layer/treatment so as to reduce or prevent fingerprints from registering. Advantageously, according to this embodiment, the glass sheet has said anti-fingerprint layer/treatment on the second textured surface. Such a layer/treatment can be combined with a transparent and electrically conducting thin layer deposited on the opposite face. Such a layer/treatment can be combined with an antireflection layer deposited on the same face. According to still another embodiment of the invention, the glass sheet has an antibacterial layer/treatment. Advantageously, according to this embodiment, the glass sheet has said antibacterial layer/treatment on the second textured surface. For example, such an antibacterial treatment could be a diffusion of silver ions in the bulk of the glass sheet close to the outer surface.

The terms "at least a" are intended herein to mean "one or more". The following examples are provided for illustrative purposes, and are not intended to limit the scope of this invention.

Example 1

A cover glass sheet of the configuration of FIG. 1 has been designed wherein the rectangular cover glass sheet has a total length of 300 mm and a total width of 150 mm. Its outer sheet face comprises a rectangular display zone having a length of 260 mm and a width of 120 mm, forming a display perimeter of 760 mm. The opaque zone is defined by the opaque painted added to all of the inner sheet face but the display zone and surrounds 100% of the display perimeter. The display zone covers 90% of the surface of the display screen. The rectangular textured zone has a length 270 mm and a width of 130 mm and surrounds 100% of the display perimeter. The textured zones covers 28% of the opaque zone.

| $Ra_{(op)}$ | $Ra_{(tex)}$ | $|Ra_{(op)} - Ra_{(tex)}|$ | Rad |
|---|---|---|---|
| 2 nm | 300 nm | 298 nm | 250 nm |

Example 2

A cover glass sheet of the configuration of FIG. 5 has been designed wherein the rectangular cover glass sheet has a total length of 500 mm and a total width of 250 mm. Its outer sheet face comprises a rectangular display zone having a length of 150 mm and a width of 100 mm, forming a display perimeter of 500 mm. The opaque zone is defined by the opaque painted added to all of the inner sheet face but the display zone and surrounds 100% of the display perimeter. Two textured zones are positioned respectively directly to each width of the display zone, each having a length 10 mm and a width of 100 mm and together surrounds 40% of the display perimeter. The textured zones cover together 1.8% of the opaque zone. The surface of the secondary textured zone covers about 4% of the opaque zone.

| $Ra_{(op)}$ | $Ra_{(tex)}$ | $|Ra_{(op)} - Ra_{(tex)}|$ | Rad | $Ra2_{(tex)}$ |
|---|---|---|---|---|
| 1 nm | 28 nm | 27 nm | 28 nm | 50 nm |

| Ref.# | Feature |
|---|---|
| 10 | Cover glass sheet |
| 20 | Display unit |
| 30 | Display device |
| 1 | Display zone |
| 2 | Opaque zone |
| 3 | Textured zone |
| 4 | Secondary textured zone |
| 5 | Layer of opaque paint |
| 6 | Outer face of the Cover Glass Sheet |
| 7 | Inner face of the Cover Glass Sheet |

The invention claimed is:

1. A cover glass sheet configured to cover at least a display device, having an outer sheet face and an inner sheet face wherein the inner sheet face faces the display device and wherein the outer sheet face comprises:
   a) a display zone allowing visualization of at least part of a screen of the display device, said display zone having a perimeter, $P_{display}$;
   b) an opaque zone corresponding to a layer of opaque paint being added at an exception of the display zone, to all or part of a remaining inner sheet face and directly surrounding at least 10-100% of the display perimeter, said opaque zone having a mean surface roughness defined by an opaque arithmetic amplitude value, $Ra_{(op)}$; and
   c) a textured zone covering between 0.5% to 99.5% of the opaque zone, said textured zone directly surrounding at least 5% of the display perimeter, and having a mean surface roughness defined by a textured arithmetic amplitude value, $Ra_{(tex)}$;
   and wherein an absolute difference between $Ra_{(op)}$ and $Ra_{(tex)}$ is at least 25 nm ($|Ra_{(op)}-Ra_{(tex)}|\geq 25$ nm).

2. The cover glass sheet according to claim 1, wherein the absolute difference between $Ra_{(op)}$ and $Ra_{(tex)}$ is at least 50 nm ($|Ra_{(op)}-Ra_{(tex)}|\geq 50$ nm).

3. The cover glass sheet according to claim 1, wherein the display zone has a mean surface roughness defined by a display arithmetic amplitude value, Rad, being equal to the mean surface roughness of the textured zone, $Ra_{(tex)}$ ($Rad=Ra_{(tex)}$).

4. The cover glass sheet according to claim 1, wherein the layer of opaque paint directly surrounds at least 25% of the display perimeter.

5. The cover glass sheet according to claim 4, wherein the layer of opaque paint directly surrounds at least 50% of the display perimeter.

6. The cover glass sheet according to claim 1, wherein the textured zone covers between 1% to 75% of the opaque zone.

7. The cover glass sheet according to claim 6, wherein the textured zone covers between 2% to 60% of the opaque zone.

8. The cover glass sheet according to claim 1, wherein the textured zone covers between 80% to 99.5% of the opaque zone.

9. The cover glass sheet according to claim 8, wherein the textured zone covers between 90% to 98% of the opaque zone.

10. The cover glass sheet according to claim 1, wherein the textured zone directly surrounds at least 10% of the display perimeter.

11. The cover glass sheet according to claim 10, wherein the at least one textured zone directly surrounds at least 75% of the display perimeter.

12. The cover glass sheet according to claim 1, wherein the outer sheet face further comprises at least a secondary textured zone indirectly surrounding the display perimeter and having a mean surface roughness defined by a second textured arithmetic amplitude value, $Ra2_{(tex)}$ wherein an absolute difference between $Ra_{(op)}$ and $Ra2_{(tex)}$ is at least 25 nm ($|Ra_{(op)}-Ra2_{(tex)}|\geq 25$ nm).

13. The cover glass sheet according to claim 12, wherein the absolute difference between $Ra_{(op)}$ and $Ra2_{(tex)}$ is at least 50 nm ($|Ra_{(op)}-Ra2_{(tex)}|\geq 50$ nm).

14. The cover glass sheet according to claim 1, wherein the cover glass sheet is a heat strengthened glass sheet or a chemically strengthened glass sheet.

15. The cover glass sheet according to claim 1, wherein the outer sheet face is coated with an anti-reflective layer.

16. The cover glass sheet according to claim 1, obtained by a method of manufacturing comprising, in order:
   a) providing a partially textured mother glass substrate having a first main surface and a second main surface which are opposed to each other,
   b) irradiating at least the first main surface of the glass substrate with a laser to form, on the first main surface, at least one separating line defining contour lines and extending in a depth direction from the first main surface to the second main surface, for dividing at least one cover glass sheet from the glass substrate, the cover glass sheet having a size smaller than a size of the mother glass substrate,
   c) optionally chemically strengthening the mother glass substrate, and
   d) separating the at least one partially textured cover glass sheet from the mother glass substrate according to the at least one separating line.

17. The cover glass sheet according to claim 16, wherein the at least one separating line formed in b) comprises a plurality of adjacent voids forming a spot-cutting line.

18. A display unit comprising a cover glass sheet according to claim 1, further comprising a display device positioned under the display zone.

19. The display unit according to claim 18, further comprising an optical bonding located between the display device and the inner sheet face of the cover glass sheet.

20. The cover glass sheet according to claim 1, or the display unit according to claim 18, configured for a car interior application, home appliances and/or integrated interactive display.

* * * * *